(12) United States Patent
Said et al.

(10) Patent No.: US 8,553,904 B2
(45) Date of Patent: Oct. 8, 2013

(54) SYSTEMS AND METHODS FOR PERFORMING SOUND SOURCE LOCALIZATION

(75) Inventors: Amir Said, Cupertino, CA (US); Bowon Lee, Mountain View, CA (US); Ton Kalker, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 383 days.

(21) Appl. No.: 12/904,921

(22) Filed: Oct. 14, 2010

(65) Prior Publication Data

US 2012/0093336 A1 Apr. 19, 2012

(51) Int. Cl.
*H04R 3/00* (2006.01)

(52) U.S. Cl.
USPC .................................................. 381/92

(58) Field of Classification Search
USPC .................................................. 381/92
See application file for complete search history.

(56) References Cited

U.S. PATENT DOCUMENTS

| | | | |
|---|---|---|---|
| 2006/0245601 A1* | 11/2006 | Michaud et al. | 381/92 |
| 2007/0223711 A1* | 9/2007 | Bai et al. | 381/56 |
| 2009/0225993 A1* | 9/2009 | Cvetkovic | 381/26 |
| 2009/0231884 A1* | 9/2009 | Bong et al. | 363/17 |

OTHER PUBLICATIONS

Hoang Do; Silverman, H.F.; YingYu; , "A Real-Time Srp-Phat Source Location Implementation using Stochastic Region Contraction(SRC) on a Large-Aperture Microphone Array," Acoustics, Speech and Signal Processing, 2007. ICASSP 2007. IEEE International Conference on , vol. 1, No., pp. I-121-I-124, Apr. 15-20, 2007 doi: 10.1109/ICASSP.2007.366631.*

Dibiase, Joseph Hector, "A High-Accuracy, Low-Latency Technique for Talker Localization in Reverberant Environments Using Microphone Arrays", May 2000.

Synnevag, Johan-Fredrik, et al, "A Low Complexity Data-Depeendent Beamforn ", IEEE International Ultrasonics symposium Proceedings, 2008.

* cited by examiner

*Primary Examiner* — Brian Ensey
*Assistant Examiner* — Katherine Faley

(57) ABSTRACT

Systems and methods for performing sound source localization are provided. In one aspect, a method for locating a sound source using a computing device subdivides a space into subregions. The method then computes a sound source power for each of subregions and determines which of the sound source energies is the largest. When the volume of the subregion is less than a threshold volume, the method outputs the subregion having the largest sound source power. Otherwise, the stages of partitioning, computing, and determining the subregion having the largest sound source power is repeated.

17 Claims, 9 Drawing Sheets

SYSTEMS AND METHODS FOR PERFORMING SOUND SOURCE LOCALIZATION

TECHNICAL FIELD

This disclosure relates to signal processing of audio signals received at microphone arrays.

BACKGROUND

In recent years, theoretical and experimental work in the use of microphone arrays have received increased interest. For example, microphone arrays can be used in audio processing tasks such as speech enhancement, denoising, interference rejection, de-reverberation, and acoustic echo cancellation. While audio processing performance may be improved by increasing the number of microphones, practical uses of large microphone arrays are often limited. For example, technological advancements enable the production of integrated microphone arrays with low cost microphones. However, in general, the overall cost of processing the large amounts of audio data captured by microphone arrays can be prohibitively high due to the time expended in transmitting the large number of audio signals to a central processing location and in the cost of computational resources used to process the audio signals at the central location. Developers and users of microphone arrays continue to seek systems and methods that improve processing audio data generated by microphone arrays.

DETAILED DESCRIPTION

This disclosure is directed to systems and methods for performing sound source localization. The methods employ a recursive subdivision of a three-dimensional search space in which the sound source is located. An approximate coordinate location of the sound source is determined using volumetric integration to compute upper bounds on the sound source power values of subregions of the search space.

Figure 1:
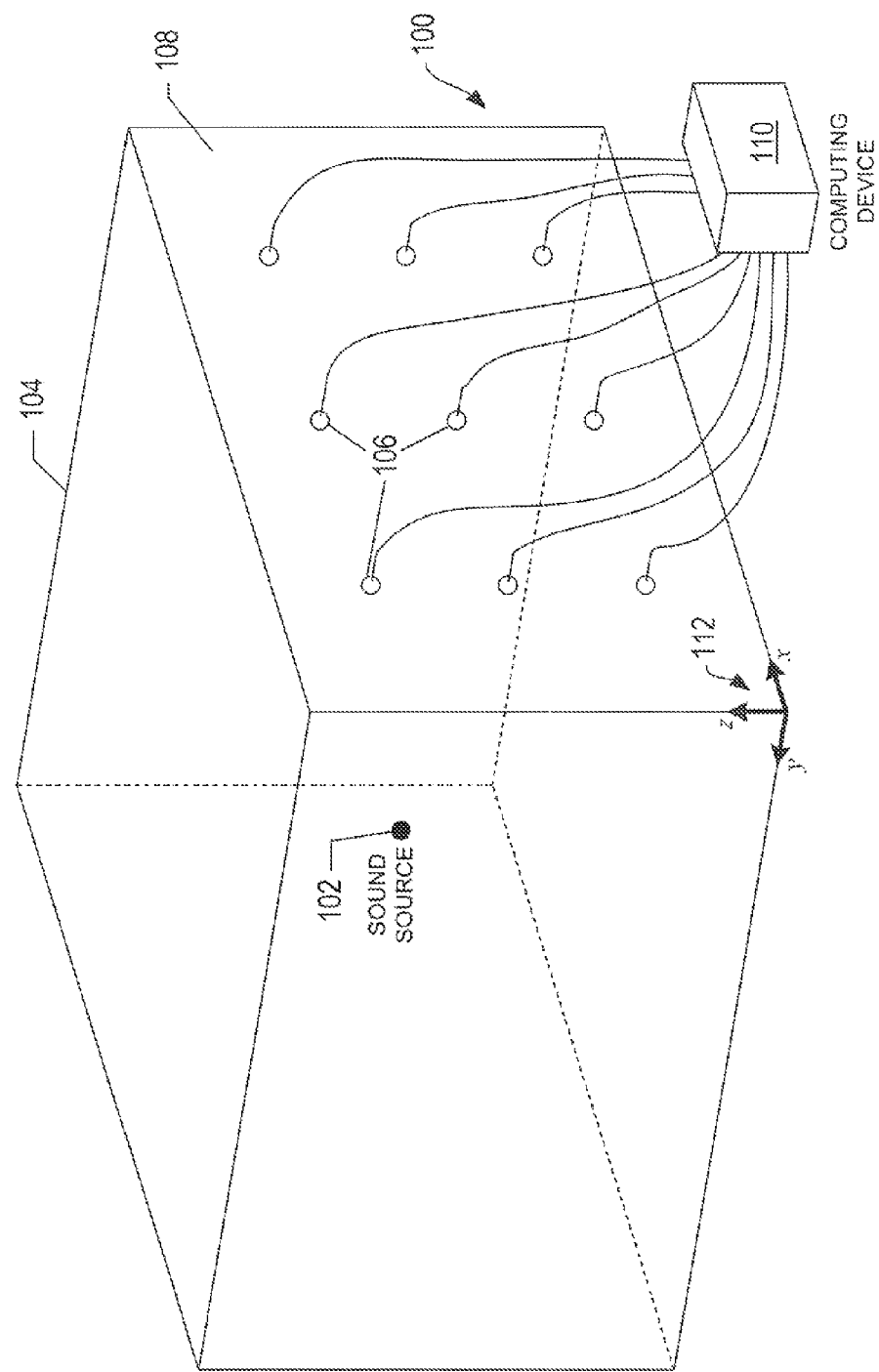
FIG. 1 shows an example system for determining an approximate coordinate location of a sound source located within a search space.

FIG. 1 shows an example system 100 for determining the approximate coordinate location of a sound source 102 located within a search space 104. The system 100 includes an array of microphones 106 disposed within a wall 108 of the search space 104. The system 100 also includes a computing device 110 electronically connected to each microphone 106. Systems are not limited to regularly spaced microphones 106. In practice, the microphones 106 can be irregularly spaced within one of the walls 108, or hanging from wires in the ceiling, and the number of microphones can vary. The microphones 106 can also be located outside the search space 104. The sound source 102 can be a person speaking or other sound generating device or entity. The search space 104 can be a room, an auditorium, or any space surrounded by walls, a floor, and ceiling. For the sake of convenience, the search space 104 is represented as a rectangular prism-shaped room with rectangular-shaped walls and rectangular-shaped floor and ceiling. However, methods and systems are not intended to be so limited with respect to the geometries of the search spaces to which they can be applied. In practice, the search space can have any regular or irregular shape.

Sounds generated by the sound source 102 are collected by each microphone 106 and converted into electronic signals that are sent to the computing device 110, which processes the electronic signals to determine an approximate coordinate location of the sound source 102. FIG. 1 and subsequent figures include Cartesian coordinate system 112 with the origin located in a corner of the search space 104. In practice, the origin of the coordinate system used to assign the approximate coordinate location of a sound source can be located at any suitable point within or outside the search space, and depending on the configuration of the search space, the coordinate system can be a cylindrical coordinate system, spherical coordinate system, or any other suitable coordinate system.

Figure 2:
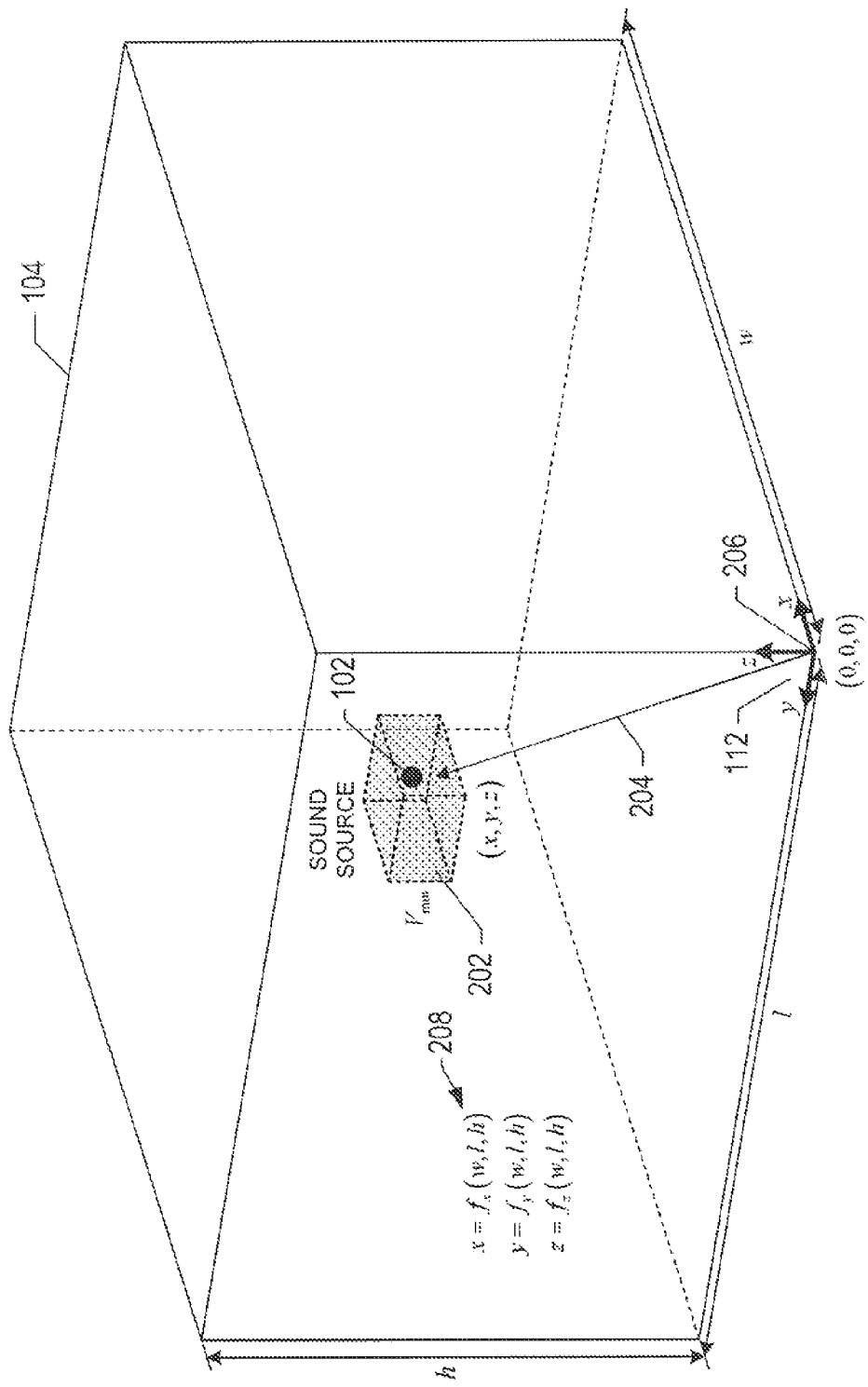
FIG. 2 shows an example virtual, rectangular region, subregion within which a sound source is located.

FIG. 2 shows an example virtual, rectangular prism-shaped, subregion 202 within which the sound source 102 is located. A vector 204 emanating from the origin 206 identifies approximate Cartesian coordinates $\bar{x}=(x, y, z)$ of the sound source 102. In the example of FIG. 2, the coordinates $\bar{x}$ can be functions 208 of the dimensions of the search space 104 denoted by w, l, and h, which represent the width, length, and height, respectively, of the search space 104. For example, the coordinates $\bar{x}$ can be the coordinates of any one of the eight corners of the subregion 202, or the coordinates $\bar{x}$ can be the center point of the subregion 202. The subregion 202 is determined by iteratively subdividing the search space into smaller subregions and determining the subregion with the largest associated sound source power, denoted by $\overline{W}(S)$, where S is a six-dimensional coordinate denoting a subregion. For example, S can include Cartesian coordinates x, y, and z that identify a coordinate location of a point, such as a corner of the subregion S, and include three additional values defining the length of the subregion sides. An example of equations used to compute a measure of the sound source power $\overline{W}(S)$ of a subregion S is described in greater detail below with reference to FIG. 8. This power measure is not the physical measure of power, but corresponds to the values obtained from calculations using the microphone signals. The iterative process of determining the subregion containing the sound source 102 is a branch-and-bound search that implicitly enumerates and tests all subregions and stops when the volume of the subregion with the largest associated sound source power is less than a predefined threshold volume $V_{th}$.

Figure 3:
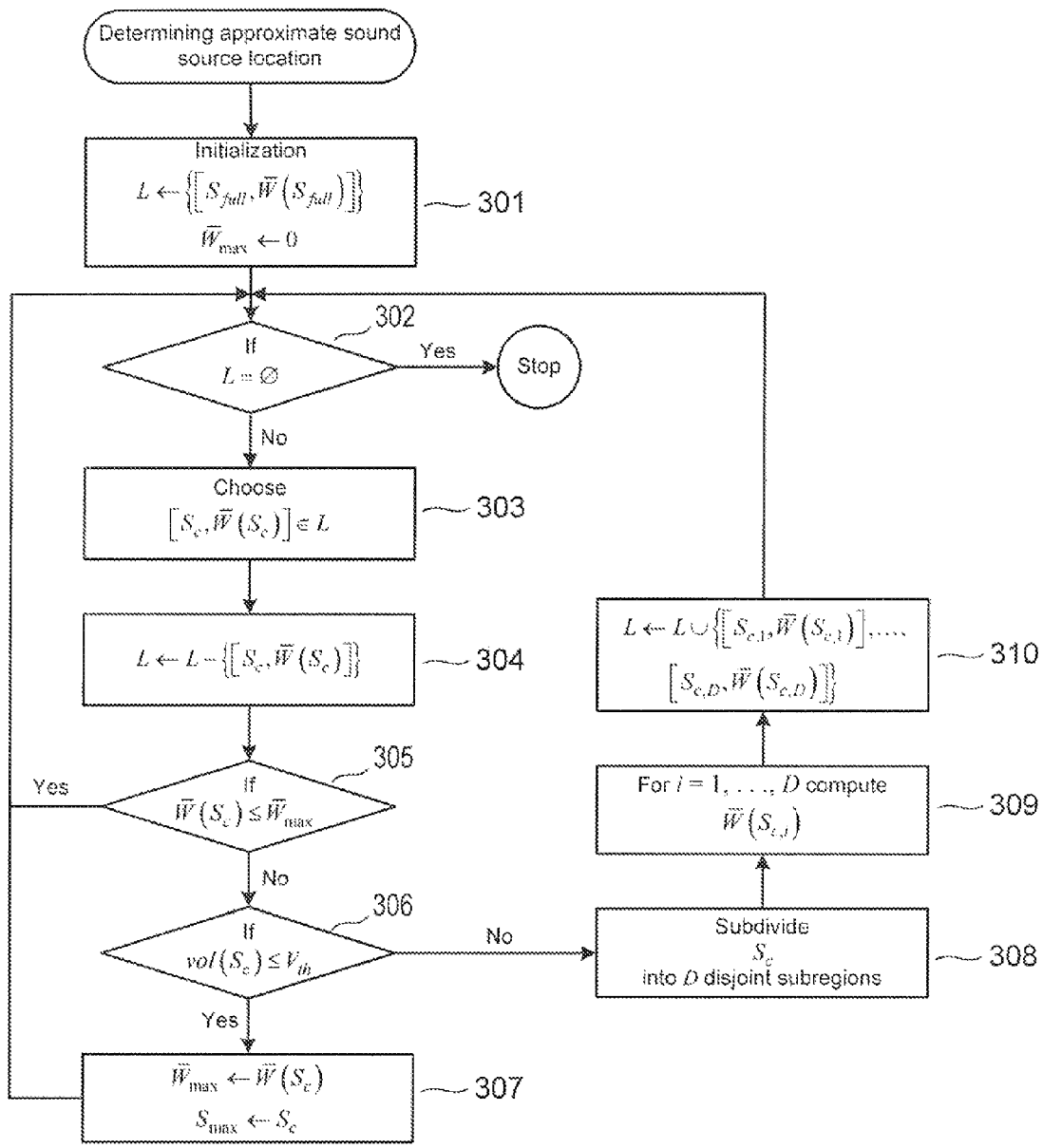
FIG. 3 shows a control-flow diagram of an example method for determining an approximate coordinate location of a sound source located within a search space.

FIG. 3 shows a control-flow diagram of an example method 300 for determining an approximate coordinate location of a sound source located within a search space. Stages of the method 300 are described with reference example subdivisions of the search space 104 shown in FIGS. 4 and 5 in order to appreciate the operations performed in each stage of the method 300. In the following description, $S_{full}$ denotes the full search space 104, and L represents a list of pairs $[S,\overline{W}(S)]$ associated the subregions S to be evaluated. In stage 301, the list L is initially populated with a single element $[S_{full}, \overline{W}(S_{full})]$, where $\overline{W}(S_{full})$ is the computed sound source power for the un-subdivided search place 104, $\overline{W}_{max}$ is a parameter initially assigned the value "0," and the parameter $S_{max}$ is left undefined. The sound source energy of the search space $\overline{W}(S_{full})$ can be computed using Equation (1) described below. In stage 302, when the list L is empty, the method stops. Otherwise, the method proceeds to stage 303. In stage 303, an element $[(S_c,\overline{W}(S_c)]$ in the list L is selected followed by deleting the element $[S_c,\overline{W}(S_c)]$ form the list L in stage 304, where c is a positive integer index. Initially, when the list L includes only the element $[S_{full},\overline{W}(S_{full})]$, the list L is empty after completing stage 304. In stage 305, when $\overline{W}(S_c)$ is less than or equal to $\overline{W}_{max}$, the method proceeds to stage 302. Otherwise, the method proceeds to stage 306. In stage 306, when the volume of $S_c$, denoted by $vol(S_c)$, is less than or equal to $V_{th}$, the method proceeds to stage 308. Otherwise, the method proceeds to stage 308. In stage 307, $\overline{W}_{max}$ is assigned the value of $\overline{W}(S_c)$ and $S_{max}$ is assigned the value $S_c$ (containing current subregion size and position) and the method returns to stage 302. Initially, $\overline{W}(S_{full})$ is greater than $\overline{W}_{max}$ and $vol(S_{full})$ is greater than $V_{th}$, and the method proceeds from stages 305 and 306 to stage 308, where the subregion $S_c$ is subdivided into D disjoint subregions $S_{c,i}$ according to:

$$\bigcup_{i=1}^{D} S_{c,i} = S_c$$

such that $S_{c,i} \neq S_{c,j}$ for $i \neq j$. In other words, subdividing the subregion $S_c$ creates a partition of the subregion $S_c$.

Figure 4:
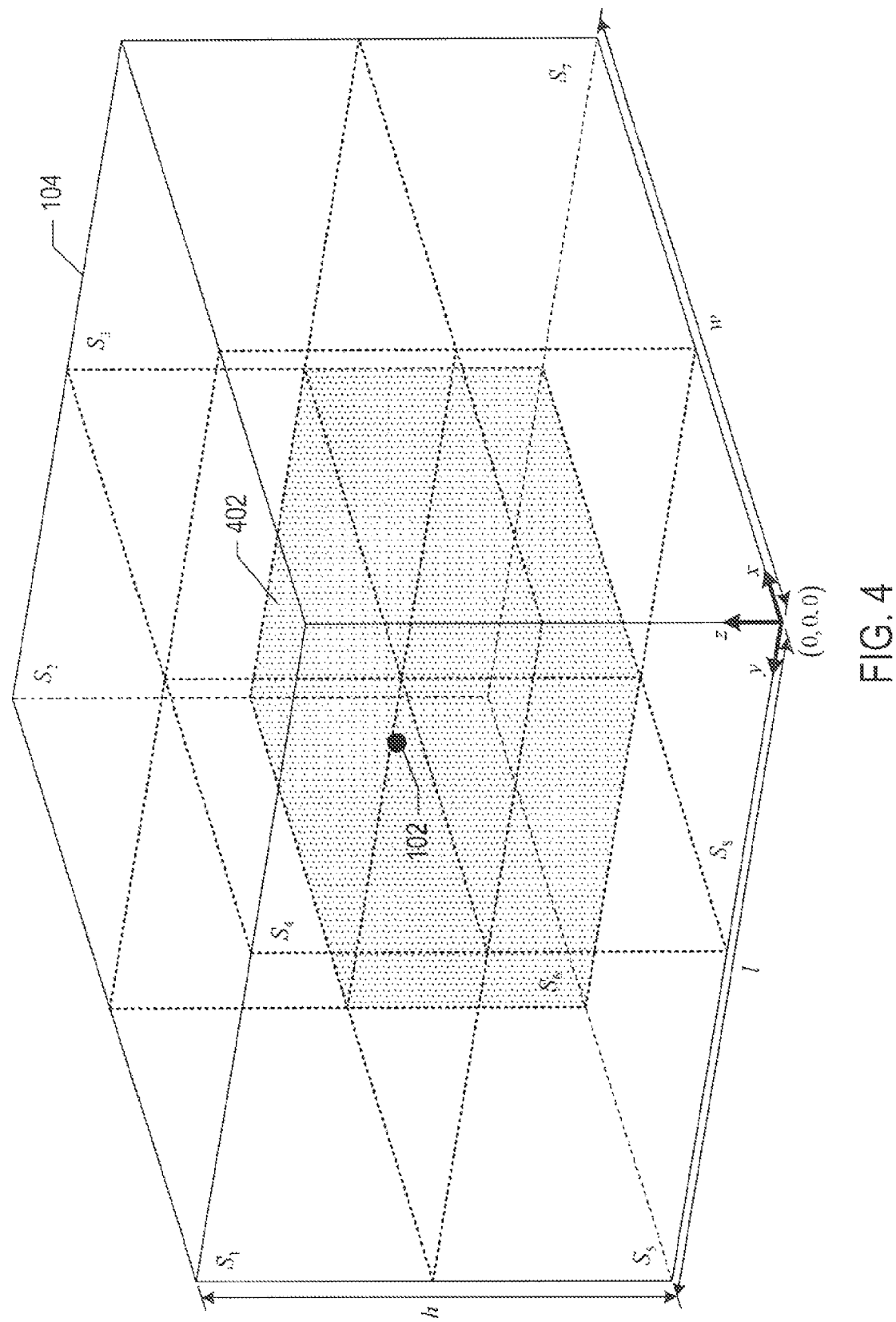
FIGS. 4-5 show an example of a branch-and-bound search for a subregion of a search space containing a sound source.

FIG. 4 shows an example of the search space. $S_{full}$ 104 initially subdivided into 8 virtual, rectangular prism-shaped, subregions denoted by $S_i$, where i is an integer index ranging from 1 to 8. In the example of FIG. 4, the subregions $S_c$ have the same rectangular prism shape and dimensions.

Returning to FIG. 3, in stage 309, the sound source power $\overline{W}(S_{c,i})$ is computed for each of the subregions. For example, returning to FIG. 4, the sound source power $\overline{W}(S_i)$ is computed for each of the eight subregions. In stage 310, the pairs $[S_{c,i},\overline{W}(S_{c,i})]$ are composed by pairing the subregion $S_{c,i}$ with the associated sound source power $\overline{W}(S_{c,i})$ and the pairs are combined to repopulate the list L. The method 300 then proceeds back to stage 302.

Figure 5:
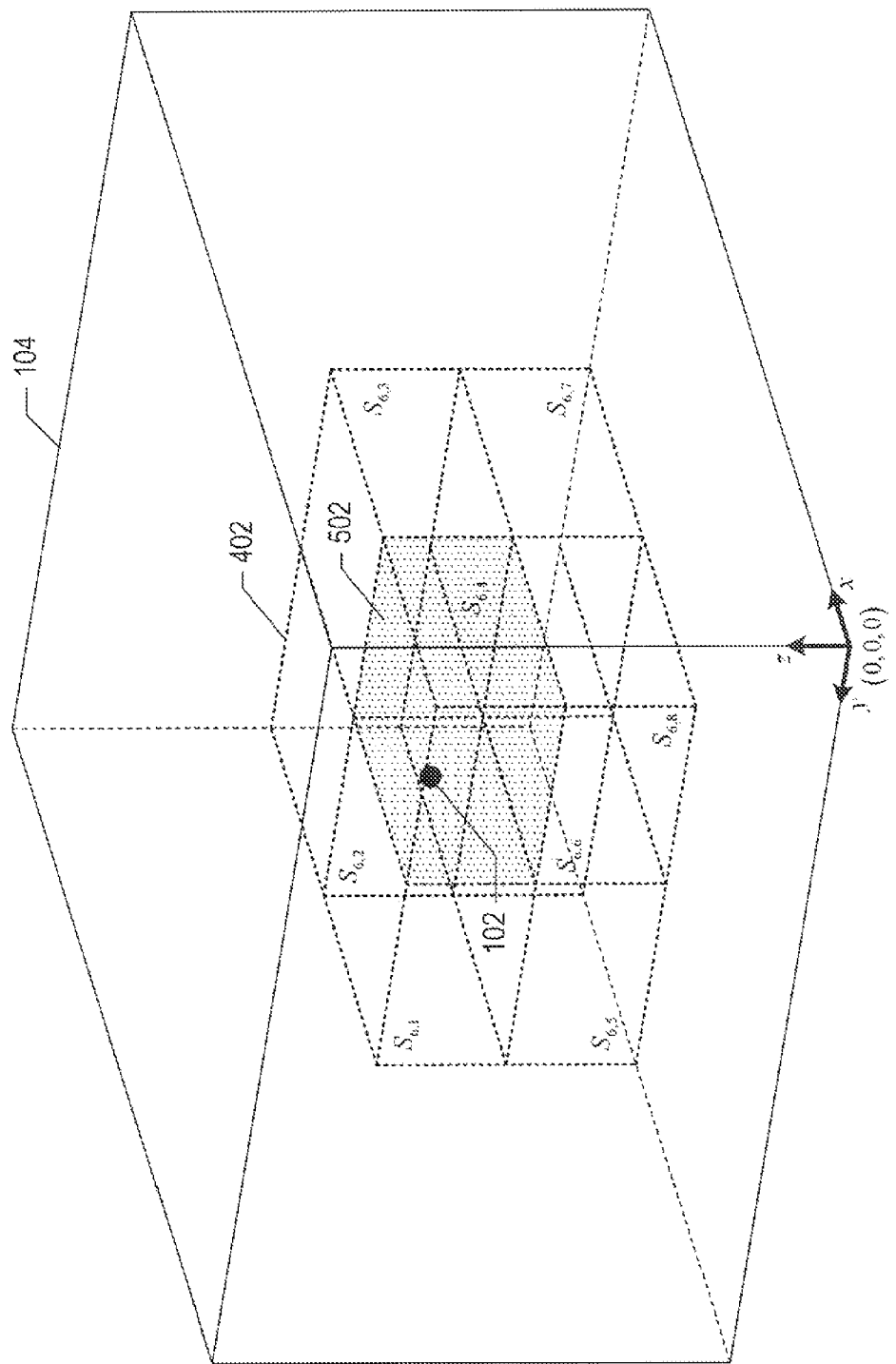

Now with reference to the example subdivision shown in FIG. 4 and the method 300 shown in FIG. 3, stages 302-305 of the method 300 are repeated for the elements of the list L, until in stage 305 a subregion with an associated sound source power greater than $\overline{W}_{max}$ is found. In FIG. 4, the subregion $S_6$ 402 is shaded and represents a subregion with $\overline{W}(S_6)$ is greater than $\overline{W}_{max}$. Method 300 then proceeds to stage 306 where the $vol(S_6)$ of the subregion $S_6$ is compared to the threshold volume $V_{th}$. In the example of FIG. 4, the $vol(S_6)$ is assumed to be greater than $V_{th}$, so method 300 proceeds to stage 308, where the subregion $S_6$ is subdivided into 8 subregions $S_{6,j}$, where j is an integer index ranging from 1 to 8, as shown in FIG. 5. In stage 309, the sound source power is computed for each of the 8 subregions $S_{6,j}$ and the list L is populated in stage 310. Stages 302-305 are repeated until, in stage 305, a subregion with an associated sound source power greater than $\overline{W}_{max}$ is found, which is identified in FIG. 5 as subregion $S_{6,4}$ 502. Method 300 then proceeds to stage 306 where the $vol(S_{6,4})$ of the subregion $S_{6,4}$ is compared to the threshold volume $V_{th}$. In this example, one more round of performing stages 308-310 and repeating stages 302-305 is carried out to arrive at the subregion 202 shown in FIG. 2. The method 300 stops when volume of the subregion is greater than the threshold volume $V_{th}$, the associated sound source power is less than $\overline{W}_{max}$ and the list L is empty.

Most of the computational complexity of this algorithm is in the calculation of $\overline{W}(V)$ in stage 309. There are several different strategies for choosing the subregion to be removed from the list L in stage 303. For example, in stage 303, the element $[S_c,\overline{W}(S_c)]$ with largest power measure $\overline{W}(S_c)$ can be selected or the element $[S_c,\overline{W}(S_c)]$ with the largest power divided by its subregion volume (i.e., $\overline{W}(S_c)/vol(S_c)$) can be selected. Method 300 finds the approximate coordinate location of the sound source with any strategy used for selecting elements of L, but the method 300 can be performed in an efficient manner with a careful selection strategy performed in stage 303.

Figure 6:
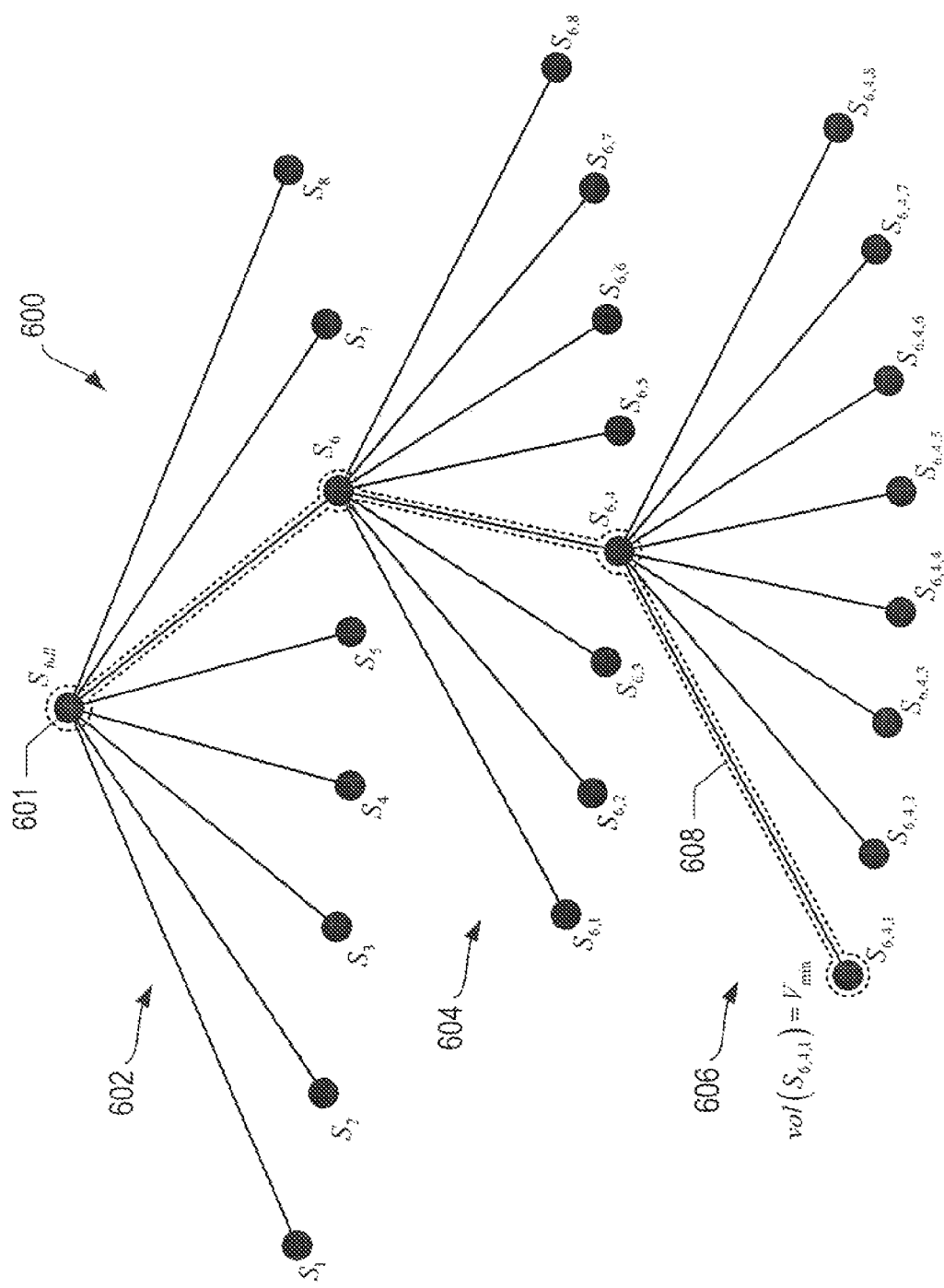
FIG. 6 shows a graph summarizing the iterative process of the branch-and-bound method for determining subregions of a search space.

FIG. 6 shows a graph 600 summarizing the iterative process of the branch-and-bound method used to determine the subregion $S_{6,4,1}$. In FIG. 6, node 601 represents the search space 104. The nodes labeled $S_1, \ldots, S_8$ each represent the subregions determined in the first iteration 602 of partitioning the search space 104, as described above with reference to FIG. 4. The subregion $S_6$ has the largest associated sound source power $\overline{W}(S_6)$, and, in the second iteration 604, the subregion $S_6$ is subdivided into eight more subregions represented by nodes labeled $S_{6,1}, \ldots, S_{6,8}$, as described above with reference to FIG. 5. The subregion $S_{6,4}$ has the largest associated sound source power $\overline{W}(S_{6,4})$, and in the third iteration 606, the subregion $S_{6,4}$ is subdivided into eight subregions represented by nodes labeled $S_{6,4,1}, \ldots, S_{6,4,8}$. Dashed-line enclosure 608 represents the path in the graph 600 from the search space 104 to the subregion $S_{6,4,1}$. In the example represented in FIG. 6, three partition iterations 602, 604, and 606 are used to reach the subregion $S_{6,4,1}$ with a volume less than the volume of a threshold $V_{th}$ and in which the sound source 102 is located in order to assign an approximate coordinate location to the sound source 102.

It is assumed in the example of FIGS. 2-6 that the subregions are inserted into the list L. Stages 303-306 correspond to sequentially testing the subregions. When the $\overline{W}(\bullet)$ value of a given subregion is smaller than $\overline{W}_{max}=\overline{W}(S_{max})$ that subregion is discarded, because it cannot contain a better solution (subregion with larger power). Otherwise, that subregion is further subdivided, using the same process described above.

Branch-and-bound methods are not limited to partitioning a space into subregions where all of the subregions have the same volume and shape. The subregions can have any suitable three-dimensional geometrical shape and the shapes can vary from iteration to iteration provided the set of subregions obtained in any one iteration partition the space. Also, and the number of subregions partitioning a space can be different at each stage of the branch-and-bound method.

Figure 7:
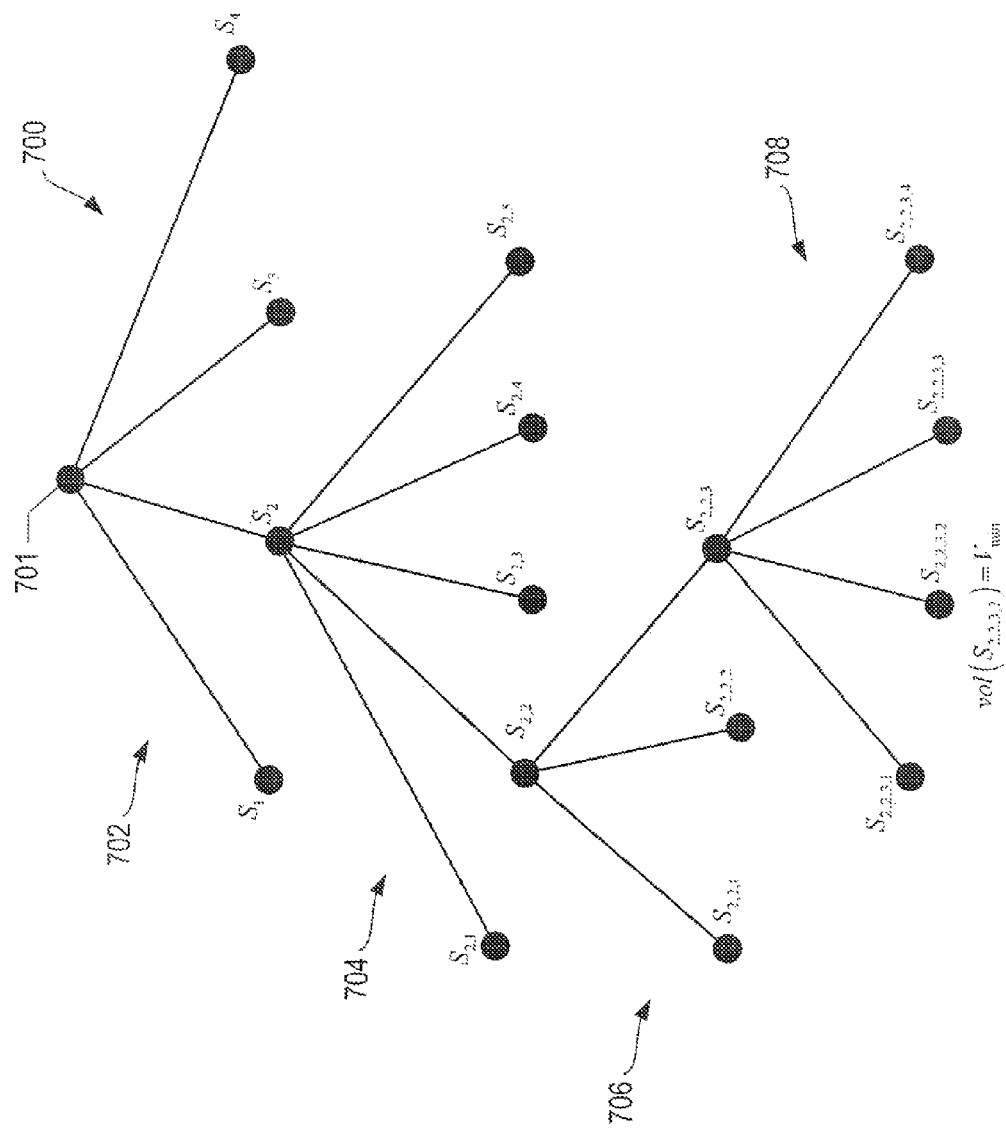
FIG. 7 shows a graph summarizing a general iterative process of an example branch-and-bound method for determining a subregion containing a sound source.

FIG. 7 shows a graph 700 summarizing a general iterative process of a branch-and-bound method for determining a subregion containing a sound source. In the first iteration 702, the search space represented by node 701 is subdivided into four subregions where the subregion represented by node $S_2$ is determined to have the largest associated sound source power $\overline{W}(S_2)$. In the second iteration 704, the subregion $S_2$ is subdivided into five subregions where the subregion represented by node $S_{2,2}$ is determined to have the largest associated sound source, power $\overline{W}(S_{2,2})$. In the third iteration 706, the subregion $S_{2,2}$ is subdivided into three subregions where the subregion represented by node $S_{2,2,3}$ is determined to have the largest associated sound source power $\overline{W}(S_{2,2,3})$. Finally, in the fourth iteration 708, the subregion $S_{2,2,3}$ is subdivided into four subregions where the subregion represented by node $S_{2,2,3,2}$ is determined to have the largest associated sound source power $\overline{W}(S_{2,2,3,2})$ and, the volume of the subregion $S_{2,2,3,2}$ is less than a threshold volume $V_{th}$.

Examples of techniques for increasing the efficiency of branch-and-bound methods can be found in "Branch and Bound Algorithms—Principles and Examples," by J. Clausen, http://www.diku.dk/OLD/undervisning/2003e/datV-optimer/JensClausenNoter.pdf; "Parallel branch-and-bound algorithms: survey and synthesis," B. Gendon and T. G. Cranic, *Operations Research*; vol. 42(6), pp. 1042-1066, 1994; and "Enumerative approaches to combinatorial optimization," T. Ibaraki, *Annals of Operations Research*, vol. 10, 1987.

Note that even though the sound source power $\overline{W}(S)$ is computed for three-dimensional subregions, certain parameters of $\overline{W}(S)$ can be pre-computed to reduce real time computation of the sound source power from evaluating three-dimensional integrals to less computationally demanding evaluation of one-dimensional integrals. Derivation of an example mathematical expression for the sound source power $\overline{W}(S)$ based on one-dimensional integral evaluations is now described.

The sound source power $\overline{W}(S)$ of a subregion S can be determined by computing the following expression:

$$\overline{W}(S) = \sum_{p=1}^{P} \left\{ [\chi_p(\zeta,S)\Phi_p(\zeta)]_{\zeta_{p,S}^{min}}^{\zeta_{p,S}^{max}} - \sum_{k=1}^{K-1} \chi_p'(\zeta_k,S)[\Phi(\zeta)]_{\zeta_k}^{\zeta_{k+1}} \right\} \quad \text{Equation (1)}$$

where $\chi_p(\zeta,S) = \int_{\bar{x} \in S} \delta(\zeta - \xi_p(\bar{x})) d\bar{x}$ is the time delay over the volume of the subregion S, $\delta(\cdot)$ is Dirac's delta function, $$\Phi_p(\zeta) = \int_{-\infty}^{\zeta} \phi_p(z) dz, \text{ and}$$

$$\chi_p'(\zeta, S) = \frac{d\chi_p(z, S)}{dz}\bigg|_{z=\zeta}$$

with z and $\zeta$ representing time.

Expressions for the time delay $\chi_p(\zeta,S)$, time derivative of the time delay $\chi_p'(\zeta,S)$, $\Phi_p(\zeta)$, and the parameters P, p, K, $\zeta_{p,S}^{max}$, and $\zeta_{p,S}^{min}$ of Equation (1) are now described with reference to FIG. 8.

Figure 8:
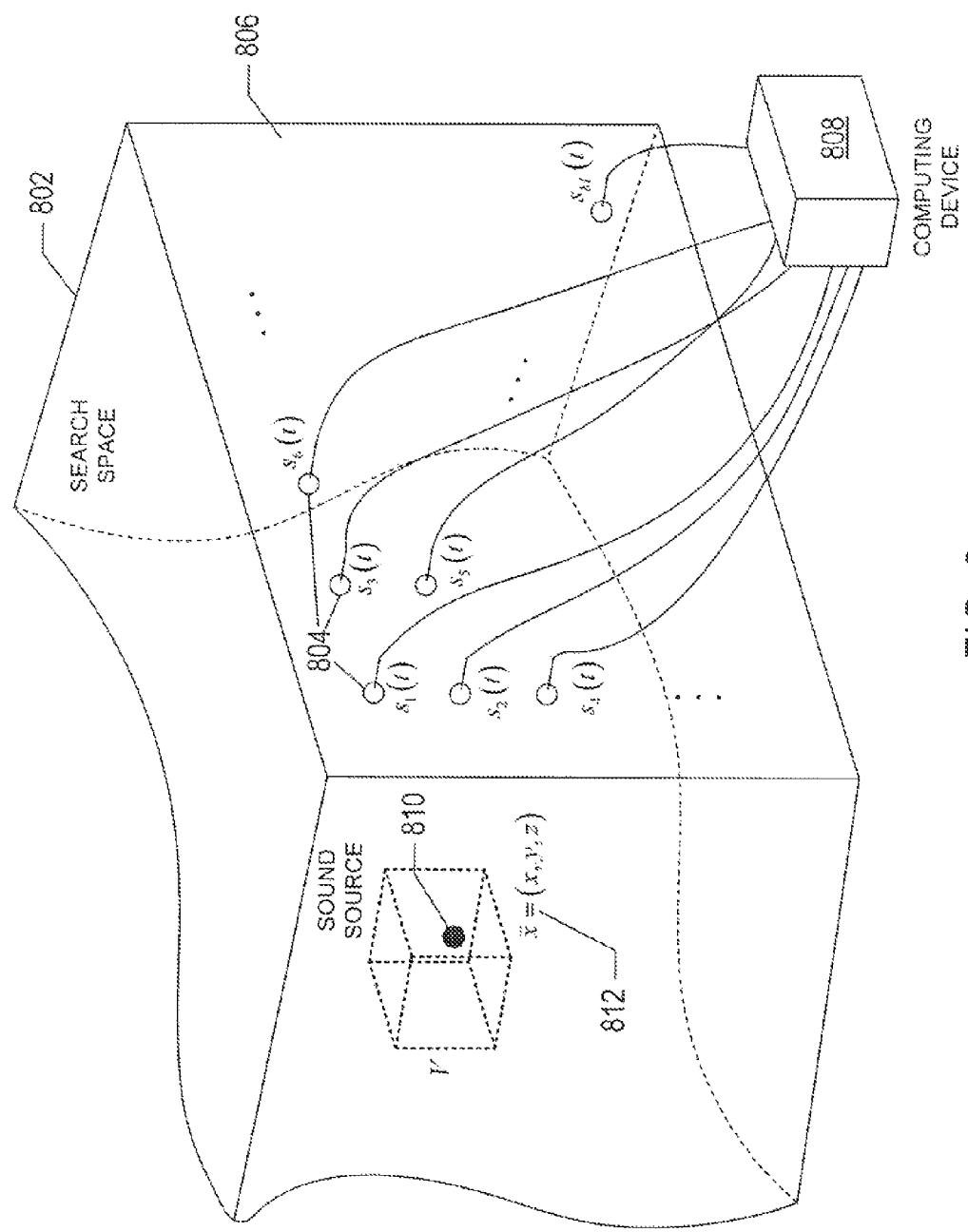
FIG. 8 shows a portion of a search space with an array of microphones electronically connected to a computing device.

FIG. 8 shows a portion of a search space 802 with an array of M microphones 804 disposed within a wall 806 of the search space 802 and are electronically connected to a computing device 808. A set of continuous time, audio signals corresponding to the M different microphones represented by $$\{s_1(t), s_2(t), \ldots, s_M(t)\}$$

are sent to the computing device 808. The signals $s_i(t)$ can be pre-filtered to improve performance. The coordinate location of a sound source 810 is denoted by $\bar{x}$ 812. Using $\tau_i(\bar{x})$ to represent the time delay at microphone i for sounds emanating from position $\bar{x}$ 812, sound source localization is based on maximizing the sound source power:

$$W_f(\bar{x}) = \int_{-\infty}^{\infty} \left[ \sum_{i=1}^{M} s_i(t - \tau_i(\bar{x})) \right]^2 dt \quad \text{Equation (2)}$$

$$= \sum_{i=1}^{M} \sum_{j=1}^{M} \int_{-\infty}^{\infty} s_i(t - \tau_i(\bar{x})) s_j(t - \tau_j(\bar{x})) dt$$

Defining $$\phi_{i,j}(\tau) = \int_{-\infty}^{\infty} s_i(t+\tau) s_j(t) dt$$

and the time delay difference between any two microphones i and j as $$\xi_{i,j}(\bar{x}) = \tau_i(\bar{x}) - \tau_j(\bar{x})$$

enables the sound source power at a point $\bar{x}$ in the search space to be re-written as:

$$W_f(\bar{x}) = \sum_{i=1}^{M} \sum_{j=1}^{M} \phi_{i,j}(\xi_{i,j}(\bar{x})) \quad \text{Equation (3)}$$

Because $\phi_{i,j}(\tau) = \phi_{j,i}(-\tau)$, $\xi_{i,j}(\bar{x}) = -\xi_{j,i}(\bar{x})$ and $\xi_{i,i}(\bar{x}) = 0$, the sum over each of the P=M (M−1)/2 possible pairs of distinct microphones can now be considered. By defining p=i(i−3)/2+j+1, the subscripts i and j in Equation (3) can be replaced to give the sound source power at the point $\bar{x}$:

$$W(\bar{x}) = \sum_{i=2}^{M} \sum_{j=1}^{i-1} \phi_{i,j}(\xi_{i,j}(\bar{x})) = \sum_{p=1}^{P} \phi_p(\xi_p(\bar{x})) \quad \text{Equation (4)}$$

In order to compute $W(\bar{x})$ for any point $\bar{x}$ in the search space, $W(\bar{x}_n)$ is computed for each point of a set of N spatial points $\{\bar{x}_1, \bar{x}_2, \ldots, \bar{x}_N\}$ of the search space and the sound energies of the N points are stored in a look-up table, where $\phi_p(\tau)$ and the time delay difference $\xi_p(\bar{x})$ are pre-computed for each $\bar{x}_n$. The sound source power $W(\bar{x})$ can then be computed using the look-up table and interpolation (see e.g., J. DiBiase, "A high-accuracy, low-latency technique for talker localization in reverberant environments," Ph.D. dissertation, Brown University, Providence, R.I., May 2000).

On the other hand, methods are directed to determining the approximate coordinate location of the sound source 808 by computing the sound source power in three-dimensional subregions of the search space by partitioning the search space where acoustic activity is detected, as described above with reference to the examples of FIGS. 3-7. Now consider the sound source power of a subregion S given by:

$$\overline{W}(S) = \int_{\bar{x} \in S} W(\bar{x}) d\bar{x}$$

$$= \sum_{p=1}^{P} \int_{\bar{x} \in S} \phi_p(\xi_p(\bar{x})) d\bar{x}$$

The integrand $\phi_p(\xi_p(\bar{x}))$ can be expanded as follows $$\phi_p(\xi_p(\bar{x})) = \int_{-\infty}^{\infty} \phi_p(\zeta) \delta(\zeta - \xi_p(\bar{x})) d\zeta$$

-continued $$= \int_{\zeta_{p,S}^{min}}^{\zeta_{p,S}^{max}} \phi_p(\zeta)\delta(\zeta - \xi_p(\bar{x}))d\zeta$$

where $\delta(\zeta)$ is the Dirac delta function enabling the sound source power of a subregion S to be characterized as:

$$\overline{W}(S) = \sum_{p=1}^{P} \int_{\zeta_{p,S}^{min}}^{\zeta_{p,S}^{max}} \phi_p(\zeta)\left[\int_{\bar{x} \in S} \delta(\zeta - \xi_p(\bar{x}))d\bar{x}\right]d\zeta$$

where the time delay is given by $$\chi_p(\zeta,S) = \int_{\bar{x} \in S} \delta(\zeta - \xi_p(\bar{x}))d\bar{x} \quad \text{Equation (5)}:$$

The sound source power of a subregion S can also be rewritten as sum of one-dimensional integrals:

$$\overline{W}(S) = \sum_{p=1}^{P} \int_{\zeta_{p,S}^{min}}^{\zeta_{p,S}^{max}} \chi_p(\zeta, V)\phi_p(\zeta)d\zeta \quad \text{Equation (6)}$$

Note that in Equation (6), calculation of the sound source power can be accomplished by evaluating a one-dimensional integral in time, but the integrand of each each term includes the time delay $\chi_P(\zeta,S)$, which, according to Equation (5), is a three-dimensional integral that depends on microphone positions and the geometry of the subregion. However, the time delay $\chi_P(\zeta,S)$ does not depend on the sound emanating from the subregion S. As a result, rather than computing the time delay $\chi_p(\zeta,S)$ for each term of Equation (6) each time the sound source power $\overline{W}(S)$ is computed, the time delay $\chi_p(\zeta,S)$ can be computed for each of the subregions prior to initiating sound source localization. For example, after the microphones have been mounted at fixed locations and the subregions that subdivide the search spaces is known in advance, the time delay $\chi_p(\zeta,S)$ for each of the subregions can be computed and stored in a look-up table. In other words, because the time delay $\chi_p(\zeta,S)$ depends only on integrating over subregion S and the spatial arrangement of microphones, $\chi_p(\zeta,S)$ can be pre-computed before sound source localization begins and stored in a look-up table. By computing the time delay in advance for each subregion and storing the time delay for each subregion in a look-up table, the complexity of computing the sound source power $\overline{W}(S)$ of a subregion according to Equation (6) is significantly reduced from having to evaluate a three-dimensional integral in space (i.e., $\chi_p(\zeta,S)$) and a one-dimensional integral in time to simply evaluating the one-dimensional integral in time. As a result, the computational demand of computing the sound source power $\overline{W}(S)$ for a large number of points using Equation (4) is significantly reduced, because most of the complexity and accuracy problems related to volumetric integrals are eliminated by pre-computing $\chi_p(\zeta,S)$, and because the one-dimensional integrals in Equation (6) can be computed more efficiently if $\chi_p(\zeta,S)$ can be approximated as a piecewise linear function. In addition, as long as the geometry of the search space does not change and the positions of the microphones remain fixed, the time delays $\chi_p(\zeta,S)$ stored in the look-up table can be used repeatedly in performing sound source localization.

The one-dimensional integrals in Equation (6) can be eliminated by first expanding the integrals using integration by parts to obtain:

$$\int_{\zeta_{p,S}^{min}}^{\zeta_{p,S}^{max}} \chi_p(\zeta, S)\phi_p(\zeta)d\zeta = \quad \text{Equation (7)}$$

$$[\chi_p(\zeta, S)\Phi_p(\zeta)]_{\zeta_{p,S}^{min}}^{\zeta_{p,S}^{max}} - \int_{\zeta_{p,S}^{min}}^{\zeta_{p,S}^{max}} \Phi(\zeta)\chi'_p(\zeta, S)d\zeta$$

where $$\Phi_p(\zeta) = \int_{-\infty}^{\zeta} \phi_p(z)dz$$

can be computed after $\phi_p(z)$ is computed, and $$\chi'_p(\zeta, S) = \left.\frac{d\chi_p(z, S)}{dz}\right|_{z=\zeta}$$

which depends only on the subregion S and microphone geometry. Second, if $\chi_p(\zeta,S)$ can be defined by a set of K linear pieces at $\{\zeta_1 = \zeta_{p,V}^{min}, \zeta_2, \ldots, \zeta_K = \zeta_{p,V}^{max}\}$, then $\chi'_p(\zeta, S)$ also assumes K constant values, and the integrals of Equation (7) can be written as follows:

$$\int_{\zeta_{p,S}^{min}}^{\zeta_{p,S}^{max}} \chi_p(\zeta, S)\phi_p(\zeta)d\zeta = \quad \text{Equation (8)}$$

$$[\chi_p(\zeta, S)\Phi_p(\zeta)]_{\zeta_{p,S}^{min}}^{\zeta_{p,S}^{max}} - \sum_{k=1}^{K-1} \chi'_p(\zeta_k, S)[\Phi(\zeta)]_{\zeta_k}^{\zeta_{k+1}}$$

Substituting Equation (8) into Equation (6) gives Equation (1), which can be used to compute the sound source power of a subregion S.

Note that the expression of the sound source power $\overline{W}(S)$ provided in Equation (1) results from having applied integration by parts to each of the integrals in Equation (6). Embodiments are not limited to the expression of the sound source power $\overline{W}(S)$ expressed in Equation (1). Other integration techniques can be used to evaluate the one-dimensional integrals in Equation (6) resulting in a variety of different expressions for the sound source energy $\overline{W}(S)$. The expression for the sound source energy $\overline{W}(S)$ given by Equation (1) represents one of many such expressions.

With the volumetric computation of $\overline{W}(S)$, branch-and-bound search methods developed for discrete and combinatorial optimization can be used to find the subregion with a volume that is less than the threshold volume $V_{th}$. In other words, branch-and-bound search methods can be used to find the maximum $\overline{W}(S)$ for a set of subregions of a search space, because the sound source power $\overline{W}(S)$ is positive valued. Thus, the total integral value for a subregion S is always an upper bound on the integral of any smaller subregion contained within S. For example, returning to the examples of FIGS. 3A and 4A, the sound source power of the subregion $S_6$ 302 is greater than the sound source power of each of the subregions $S_{6,j}$, for j equal to 1 through 8.

Assuming point sound sources and that the subregions can be subdivided until reaching a pre-defined minimum subregion with volume $V_{min}$, the sound source power of each subregion can continue to be calculated for each subregion. The efficiency of branch-and-bound methods, such as the branch-and-bound method described above with reference to FIGS. 3-6, is predicated on if the sound source power of a subregion S is smaller than the sound source power of the known minimum subregion, then the subregion S is not subdivided because the subregion S does contain the optimal sound source power.

Figure 9:
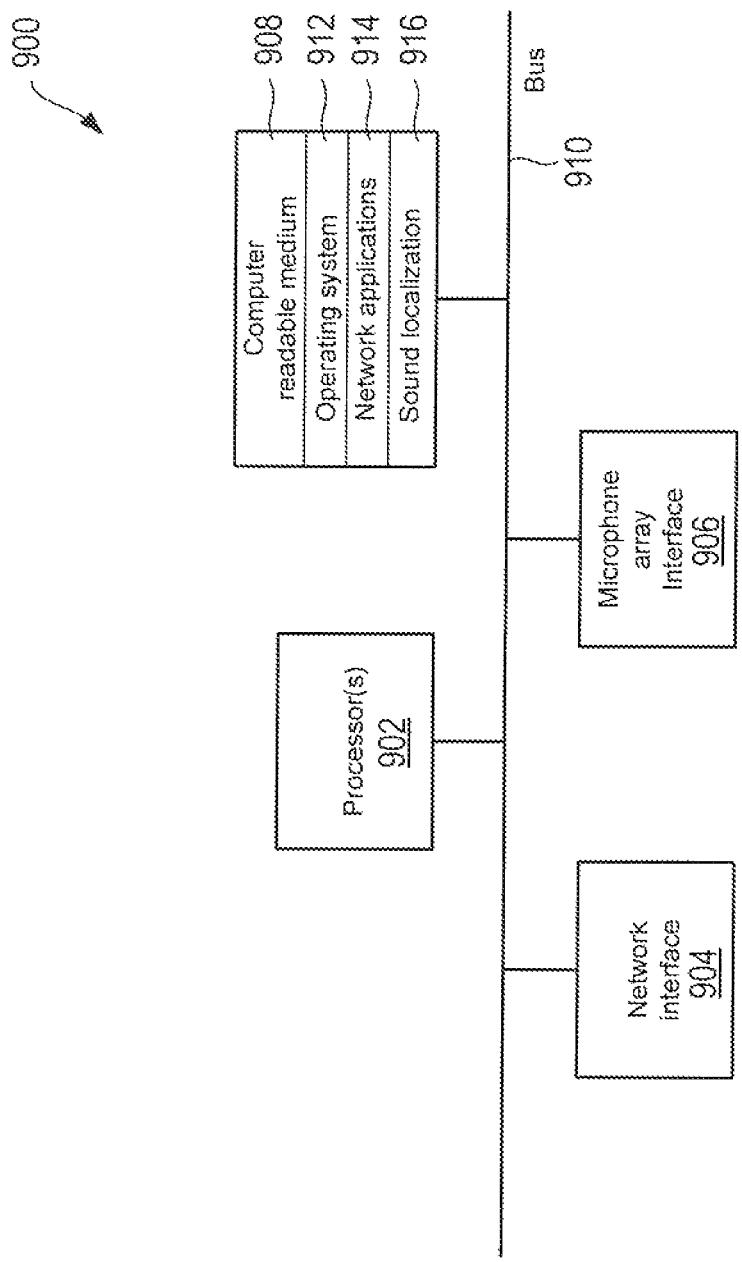
FIG. 9 shows a schematic representation of a computing device that determines a subregion containing a sound source.

Methods for determining an approximate coordinate location of a sound source described above are performed using a computing device. The computing device can be a desktop computer, a laptop, or any other suitable computational device that can be used to process the audio signals generated by an array of microphones. FIG. 9 shows a schematic representation of a computing device 900. The device 900 includes one or more processors 902, such as a central processing unit; one or more network interfaces 904, such as a Local Area Network LAN, a wireless 802.11x LAN, a 3G mobile WAN or a WiMax WAN; a microphone array interface 906, and one or more computer-readable mediums 908. Each of these components is operatively coupled to one or more buses 910. For example, the bus 912 can be an EISA, a PCI, a USB, a FireWire, a NuBus, or a PDS.

The computer readable medium 908 can be any suitable medium that provides-machine-readable instructions to the processor 902 for execution. For example, the computer-readable medium 908 can be non-volatile media, an optical disk, a magnetic disk, or a magnetic disk drive; volatile media, such as memory; and transmission media, such as coaxial cables, copper wire, and fiber optics. The computer-readable medium 908 can also store other kinds of machine-readable instructions, including word processors, browsers, email, Instant Messaging, media players, and telephony software.

The computer-readable medium 908 may also store an operating system 912, such as Mac OS, MS Windows, Unix, or Linux; network applications 914; and machine-readable instructions for performing sound source localization 916. The operating system 912 can be multi-user, multiprocessing, multitasking, multithreading, real-time and the like. The operating system 912 can also perform basic tasks such as recognizing input from input devices, such as a keyboard, a keypad, or a mouse; sending output to a projector and a camera; keeping track of files and directories on medium 908; controlling peripheral devices, such as disk drives, printers, image capture device; and managing traffic on the one or more buses 910. The network applications 914 includes various components for establishing and maintaining network connections, such as machine-readable instructions for implementing communication protocols including TCP/IP, HTTP, Ethernet, USB, and FireWire.

The sound localization medium 916 provides various machine-readable instruction components for determining a coordinate location of a sound source, as described above. In certain examples, some or all of the processes performed by the sound localization medium 916 can be integrated into the operating system 912. In certain examples, the processes can be at least partially implemented in digital electronic circuitry, or in computer hardware, or in any combination thereof.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments are presented for purposes of illustration and description. They are not intended to be exhaustive of or to limit this disclosure to the precise forms described. Obviously, many modifications and variations are possible in view of the above teachings. The embodiments are shown and described in order to best explain the principles of this disclosure and practical applications, to thereby enable others skilled in the art to best utilize this disclosure and various embodiments with various modifications as are suited to the particular use contemplated. It is intended that the scope of this disclosure be defined by the following claims and their equivalents:

The invention claimed is:

1. A method of locating a sound source using a computing device, the method comprising:
executing, by the computing device, an iterative process, each iteration of the iterative process comprising:
subdividing a current space into a plurality of subregions, each subregion having an associated subregion volume;
computing a sound source power for each subregion;
selecting a subregion of the plurality of subregions having a largest sound source power of the computed sound source powers;
determining whether the subregion volume associated with the selected subregion is less than a threshold volume;
in response to determining that the associated subregion volume is equal to or exceeds the threshold volume, setting the current space to the subregion having the largest sound source power, and repeating the iterative process; and
in response to determining that the associated subregion volume is less than the threshold volume, outputting the subregion having the largest sound source power as a location of the sound source.

2. The method of claim 1, wherein selecting the subregion having the largest sound source power further comprises:
populating a list of the plurality of subregions and associated sound source powers; and
selecting the subregion and associated sound source power as the subregion having the largest sound source power from the list of subregions and associated sound source powers.

3. The method of claim 1, wherein selecting the subregion having the largest sound source power further comprises:
populating a list of the subregions and associated sound source powers and subregion volumes; and
selecting, from the list, the subregion having a largest value computed by dividing the associated sound source power by the associated subregion-volume.

4. The method of claim 1, wherein the space comprises a microphone array having a number of microphone pairs, and computing the sound source power further comprises computing:

$$W(S) = \sum_{p=1}^{P} \left\{ [\chi_p(\zeta, S)\Phi_p(\zeta)]_{\zeta_{p,S}^{min}}^{\zeta_{p,S}^{max}} - \sum_{k=1}^{K-1} \chi'_p(\zeta_k, S)[\Phi(\zeta)]_{\zeta_k}^{\zeta_{k+1}} \right\}$$

where $\chi_p(\zeta,S) = \int_{\bar{x}\in S} \delta(\zeta - \xi_p(\bar{x})) \, d\bar{x}$ is the time delay over the subregion S, $$\Phi_p(\zeta) = \int_{-\infty}^{\zeta} \phi_p(z) dz,$$

$$\chi'_p(\zeta, S) = \frac{d\chi_p(z, S)}{dz}\bigg|_{z=\zeta},$$

K is an index for the set $\{\zeta_1 = \zeta_{p,S}^{min}, \zeta_2, \ldots, \zeta_K = \zeta_{p,S}^{max}\}$ of times, P=M (M−1)/2 is the number of microphone pairs in the microphone array, and p=i(i−3)/2+j+1 is an index representing the ith and jth microphone pair.

5. The method of claim 1, wherein for each iteration, the associated subregion volumes are equal to a single volume known prior to locating the sound source, the method further comprising:
   computing, prior to locating the sound source, a time delay for each known volume to be used in each iteration of the iterative process;
   evaluating at each iteration of the process, a one-dimensional integral of the sound source power for each subregion of the plurality of subregions; and
   computing the sound source power for each of the subregions based on the computed time delay and the evaluated one-dimensional integral of the sound source power.

6. A non-transitory computer-readable medium having instructions encoded thereon, wherein the instructions when executed by a processor, cause the processor to:
   subdivide a current space into a plurality of subregions, each subregion having an associated subregion volume;
   compute a sound source power for each subregion;
   select a subregion of the subregions having a largest sound source power of the computed sound source-powers;
   determine whether the subregion volume associated with the selected subregion is less than a threshold volume;
   in response to a determination that the associated subregion volume equals or exceeds the threshold volume, set the current space to the subregion having the largest sound source power, and repeat the iterative process; and
   in response to a determination that the associated subregion volume is less than the threshold volume, outputting the subregion having the largest sound source power as a location of the sound source.

7. The non-transitory computer-readable medium of claim 6, wherein to select the subregion having the largest sound source power of the sound source powers, the instructions are further to cause the processor to:
   populate a list of the plurality of subregions and associated sound source powers; and
   select from the list the subregion with the largest sound source power.

8. The non-transitory computer-readable medium of claim 6, wherein to select the subregion having the largest sound source power of the sound source powers, the instructions are further to cause the processor to:
   populate a list of the plurality of subregions and associated sound source powers and subregion volumes; and
   select from the list the subregion having a largest value computed by dividing an associated sound source power by the associated subregion volume.

9. The non-transitory computer-readable medium of claim 6, wherein the space comprises a microphone array having a number of microphone pairs, and to compute the sound source power, the instructions are to cause the processor to further compute:

$$\overline{W}(S) = \sum_{p=1}^{P} \left\{ [\chi_P(\zeta, S)\Phi_p(\zeta)]_{\zeta_{p,S}^{min}}^{\zeta_{p,S}^{max}} - \sum_{k=1}^{K-1} \chi'_P(\zeta_k, S)[\Phi(\zeta)]_{\zeta_k}^{\zeta_{k+1}} \right\}$$

where $\chi_p(\zeta,S) = \int_{\bar{x} \in S} \delta(\zeta - \xi_p(\bar{x})) \, d\bar{x}$ is the time delay over the subregion S, $$\Phi_p(\zeta) = \int_{-\infty}^{\zeta} \phi_p(z) dz,$$

$$\chi'_P(\zeta, S) = \frac{d\chi_P(z, S)}{dz}\bigg|_{z=\zeta},$$

K is an index for the set $\{\zeta_1 = \zeta_{p,S}^{min}, \zeta_2, \ldots, \zeta_K = \zeta_{p,S}^{max}\}$ of times, P=M (M−1)/2 is the number of microphone pairs in the microphone array, and p=i(i−3)/2+j+1 is an index representing the ith and jth microphone pair.

10. The non-transitory computer-readable medium of claim 6, wherein for each iteration, the associated subregion volumes are equal to a single volume known prior to locating the sound source, and to compute the sound source power for each subregion the instructions are to further cause the processor to:
   compute, prior to locating the sound source, a time delay for each known volume to be used in each iteration of the iterative process;
   evaluate at each iteration of the process a one-dimensional integral of the sound source power for each subregion; and
   compute the sound source power for each subregion based on the computed time delay and the evaluated one-dimensional integral of the sound source power.

11. A sound source localization system comprising;
   an array of microphones disposed to capture sounds of a space;
   a computing device electronically connected to the microphones and including:
      a processor, and
      a memory having instructions stored therein for locating a sound source, wherein the instructions are to cause the processor to:
         subdivide a current space into a plurality of equal subregions, each subregion having an associated subregion volume;
         compute a sound source power for each subregion;
         select a subregion of the subregions having a largest sound source power of the computed sound source-powers;
         determine whether the subregion volume associated with the selected subregion is less than a threshold volume;
         in response to a determination that the associated subregion volume is equal to or greater than the threshold volume, setting the current space to the subregion having the largest sound source power, and repeat the iterative process; and
         in response to determination that the associated subregion volume is less than the threshold volume, outputting the subregion having the largest sound source power as a location of the sound source.

12. The system of claim 11, wherein to select the subregion having the largest sound source power, the instructions are to further cause the processor to:
   populate a list of the subregions and associated sound source powers; and
   select from the list, the subregion with the largest sound source power.

13. The system of claim 11, wherein to select the subregion having the largest sound source power, the instructions are to further cause the processor to:

populate a list of the subregions and associated sound source powers and subregion volumes; and select from the list the subregion having a largest value computed by dividing an associated sound source power by the associated subregion volume.

14. The system of claim 11, wherein the microphones of the array of microphones are randomly distributed.

15. The system of claim 11, wherein the microphones of the array of microphones are regularly distributed.

16. The system of claim 11, wherein to compute the sound source power, the instructions are to cause the processor to compute:

$$\overline{W}(S) = \sum_{p=1}^{P} \left\{ [\chi_p(\zeta,S)\Phi_p(\zeta)]_{\zeta_{p,S}^{min}}^{\zeta_{p,S}^{max}} - \sum_{k=1}^{K-1} \chi'_p(\zeta_k,S)[\Phi(\zeta)]_{\zeta_k}^{\zeta_{k+1}} \right\}$$

where $\chi_p(\zeta,S) = \int_{\overline{x} \in S} \delta(\zeta - \xi_p(\overline{x})) \, d\overline{x}$ is the time delay over the subregion $S$, $\Phi_p(\zeta) = \int_{-\infty}^{\zeta} \phi_p(z) dz$, $$\chi'_p(\zeta,S) = \frac{d\chi_p(z,S)}{dz} \bigg|_{z=\zeta},$$

K is an index for the set $\{\zeta_1 = \zeta_{p,S}^{min}, \zeta_2, \ldots, \zeta_K = \zeta_{p,S}^{max}\}$ of times, P=M (M−1)/2 is the number of microphone pairs in the microphone array, and p=i(i−3)/2+j+1 is an index representing the ith and jth microphone pair.

17. The system of claim 11, wherein for each iteration, the associated subregion volumes are equal to a single volume known prior to locating the sound source, wherein to compute the sound source power for each subregion, the instructions are to cause the processor to:

compute, prior to locating the sound source, a time delay for each known volume to be used in the iterative process;

evaluate at each iteration of the process a one-dimensional integral of the sound source power for each subregion; and compute the sound source power for each subregion based on the computed time delay and the evaluated one-dimensional integral of the sound source power.

* * * * *